United States Patent
Muschketat (10) Patent No.: US 7,316,575 B2
(45) Date of Patent: Jan. 8, 2008

(54) CASING TERMINATION FOR ELECTRONIC CASING AND METHOD FOR ITS MANUFACTURE

(75) Inventor: Klaus Muschketat, Ladenburg (DE)

(73) Assignee: Pepperl & Fuchs GmbH, Manheim (DE)

( * ) Notice: Subject to any disclaimer, the term of this patent is extended or adjusted under 35 U.S.C. 154(b) by 0 days.

(21) Appl. No.: 11/619,381

(22) Filed: Jan. 3, 2007

(65) Prior Publication Data

US 2007/0161268 A1    Jul. 12, 2007

(30) Foreign Application Priority Data

Jan. 10, 2006   (DE)   ................. 10 2006 001 290

(51) Int. Cl.
*H01R 12/00*   (2006.01)
(52) U.S. Cl. ............... 439/76.1; 439/910; 439/913; 439/490; 439/447
(58) Field of Classification Search ............... 439/76.1, 439/445, 447, 913, 910, 490
See application file for complete search history.

(56) References Cited

U.S. PATENT DOCUMENTS

| | | | |
|---|---|---|---|
| 5,244,409 A | | 9/1993 | Guss, III et al. |
| 5,470,252 A | * | 11/1995 | Fladung ...................... 439/490 |
| 6,572,402 B2 | * | 6/2003 | Lin ........................... 439/490 |
| 6,743,044 B2 | * | 6/2004 | Musolf et al. .............. 439/490 |
| 7,138,926 B2 | * | 11/2006 | Henry et al. ............. 340/693.5 |

FOREIGN PATENT DOCUMENTS

DE    198 22 354 A 1    12/1999

\* cited by examiner

*Primary Examiner*—Tho D. Ta
(74) *Attorney, Agent, or Firm*—Hoffman, Warnick & D'Alessandro LLC (57) ABSTRACT

The invention relates to a casing termination for an electronic casing, particularly sensor casing, with several contact elements for contacting a circuit received in an electronic casing, with a connecting cable having several conductors in each case connected to the contact elements, and with at least one lighting element, particularly a light emitting diode, for providing an optical display for a user. The casing termination is inventively characterized in that the contact elements and lighting element are housed in an at least partly transparent contact display module which, together with an end region of the connecting cable is at least partly surrounded by an at least partly transparent integrally manufactured envelope for mechanical stabilization and electrical insulation purposes and which is connected in tension-proof manner to the contact display module. The invention also relates to a method for the manufacture of a casing termination for an electronic casing.

19 Claims, 6 Drawing Sheets

CASING TERMINATION FOR ELECTRONIC CASING AND METHOD FOR ITS MANUFACTURE

The invention relates to a casing termination for an electronic casing, particularly a sensor casing, according to the preamble of claim 1. In claim 17 the invention also relates to a method for the manufacture of a casing termination for an electronic casing.

Such a casing termination has several contact elements, particularly contact pins, for contacting a circuit received in the electronic casing. The contact elements are connected to conductors of a connecting cable. A lighting element, particularly a light emitting diode is also provided for supplying an optical display for a user.

Such casing terminations are generally used for electronic casings and in particular for cylindrical, sleeve-like casings. Such casing forms are e.g. used for sensors, particularly for proximity switches.

Such a casing termination formed from a plurality of parts is disclosed in DE 101 08 350 C1. In order to obtain a particularly high strength and sealing action, a structure is chosen therein in which a cap is pressed over an insulating part and a connecting part.

The multipart structure described therein is complicated and expensive to manufacture.

The object of the invention is to provide a casing termination for an electronic casing, which has a very compact structure and is easy to manufacture, which has high cable disconnection forces and a switching state display, which is visible both from the side and in the cable exit direction. Using the casing termination according to the invention, the installation of a terminal device, particularly a sensor, is made particularly easy and reliable. A method for the manufacture of a casing termination is also given.

In a first aspect this object is achieved according to the invention by the casing termination having the features of claim 1. In a further aspect the object is achieved by the method having the features of claim 17.

Preferred developments of the invention casing termination and advantageous further developments of the inventive method form the subject matter of subclaims. They more particularly relate to a sensor module and a sensor, in which the inventive casing termination is used.

The casing termination of the aforementioned type is inventively further developed in that the contact elements and lighting element are housed in an at least partly transparent contact display module which, together with an end region of the connecting cable, is surrounded by an at least partly transparent, integrally manufactured envelope for mechanical stabilization and electrical insulation purposes, so that the connecting cable is connected in tension-proof manner to the contact display module.

A first essential idea of the invention is that for the provision of a contacting and a display function firstly a substantially integral and at least partly transparent contact display module is provided. Compared with the multipart, prior art structures, this in itself leads to a significant simplification and therefore important cost advantages during manufacture.

A further essential idea of the invention is that the contact display module, together with an end region of the connecting cable, is provided with an also integral and at least partly transparent envelope providing an electrical insulation and a mechanical stabilization of the structure.

Therefore the casing termination according to the invention is consequently overall constructed with a very few components, so that manufacture is correspondingly simplified.

An important advantage from the mechanical standpoint is that in simple manner a tension-proof connection is obtained between the contact display module and connecting cable, so that there are high cable disconnection forces.

In the method according to the invention the conductors of a connecting cable are connected to contact elements, particularly contact pins, which are received in an at least partly transparent contact display module. According to the invention in a receptacle provided in the contact display module is received a lighting element, particularly a light emitting diode. According to the invention, for electrical insulation and mechanical stabilization purposes, around the contact display module and an end region of the connecting cable is provided an at least partly transparent, integral envelope.

In a particularly advantageous development of the inventive casing termination the envelope has a larger diameter, casing-near connection area and a smaller diameter, casing-remote cable extension, a transition between the connecting area and cable extension being constructed for a tension-proof, back-engagement with a casing sleeve. This can be particularly simply implemented from the manufacturing standpoint and also permits the assembly of a terminal device, e.g. a sensor in a one-way process. This is understood to mean a process in which e.g. a sensor module is inserted together with an inventive casing termination into a casing sleeve. As the casing sleeve can be terminated on a side opposite to the casing termination with a front cap, which can also be called a cup, for assembly purposes only one method step is effectively required.

Therefore the object of the invention is also a sensor module with an inventive casing termination, with an electric circuit placed on a printed circuit board, the contact pins and the terminals of the lighting element, particularly the light emitting diode, of the casing termination being connected, particularly soldered to the printed circuit board and with a sensor element positioned facing the casing termination on said circuit board. The sensor element can fundamentally be a random sensor, e.g. an ultrasonic, temperature, Hall and/or pressure sensor. In particularly advantageous manner the technology described here can be used in connection with proximity switches, i.e. the sensor element is a coil with a ferrite element.

In a particularly simple, but still effective manufacturing variant for a sensor, the casing sleeve can be connected in tension-proof manner to the casing termination by a flanged edge of the casing sleeve.

Particular preference is also given to a variant in which the envelope is fitted by moulding the contact display module and end region of the connecting cable. Thus, the desired electrical and mechanical functionality of the envelope can be particularly reliably and simply achieved.

Appropriately the envelope surrounds the end region of the connecting cable and the contact display module in a circumferentially complete manner. It is also advantageous in this connection if e.g. a substantially cylindrical area of the contact display module from which contact pins and terminals of a light emitting diode project axially, is not surrounded by said envelope. Around said cylindrical area can then be provided a sealing element, which improves the sealing of the electronic casing when the latter is assembled.

In principle, admittedly other manufacturing variants for the envelope are conceivable. For example the envelope could be bonded or welded to form an integral envelope from two halves. However, up to now these variants have not led to satisfactory results. In particular, the sealing action and tensile strength have not been adequate. Moreover these manufacturing variants are comparatively complicated.

In preferred developments both the envelope and the contact display module are made from transparent plastics. With regards to the functionality of the envelope as a cable bushing preferably a softer material is chosen for the envelope than for the contact display module.

To achieve an optimum mechanical cohesion and in particular high cable disconnection forces, the contact display module preferably has at least one, more especially circumferential, profiling. On said profiling the e.g. moulded envelope can be braced with respect to tensile forces.

For electrical insulation and mechanical stabilization purposes internal cavities of electronic devices are preferably foamed or cast with a curing, insulating material. So that the air present in the casing interior can escape during installation, with the inventive casing termination an air duct is appropriately formed in the contact display module and/or in the envelope.

Cleaning excess casting or foaming material which may have passed to the outside from a finished terminal device can be obviated if the air duct contains a semipermeable element, which is permeable for air and impermeable for a foaming or casting material used. Preferably such a semipermeable element is constituted by a small felt fragment in the air duct. However, it is in principle possible to use random other textile or fibrous materials, e.g. also wool, for preventing an escape of casting or foaming material.

An air duct can e.g. be formed by a groove on the outside of the envelope extending into the casing interior. This groove can be closed on manufacturing the device, e.g. by a flanged edge of the casing sleeve.

A better sealing of the casing is achieved in a variant in which the contact display module as part of the air duct has an axially extending blind hole with a lateral opening at right angles to the axial direction. Appropriately, the envelope as part of the air duct then also has an external, axially directed groove with a connecting opening at right angles to the axial direction and which is aligned with the lateral opening of the contact display module. The connecting opening in the envelope can e.g. be formed by a borehole. Through said borehole it is simultaneously possible to make the lateral opening in the contact display module.

In an alternative variant the aforementioned groove is not provided and in a particularly elegant manner an escape of the casting or foaming material is prevented. The envelope has a plurality of sealing rings for sealing with respect to a casing sleeve to be engaged over a partial area of the envelope on assembling the casing. For the provision of a ventilation opening at least one of the sealing rings is provided with at least one axial opening.

Appropriately the above-described air duct is constructed in such a way that its outlet port is constructed on the envelope within the innermost sealing ring provided with an axial opening. The connecting cable is considered to be outside and the contact pins of the contact display module are considered as inside.

The fundamental essential idea in this relation is that any casting or foaming material passing out of the air duct during assembly of the device must, in order to pass to the outside, traverse a very long path and consequently sets or cures beforehand.

Particular preference is given in this connection to a variant in which at least two sealing rings have an axial opening, said openings of the sealing rings being mutually offset in the rotation or circumferential direction and in particular on opposite sides to one another.

In order to actually pass to the outside in this embodiment any casting or foaming material exiting the air vent would initially have to pass through the opening of the inner sealing ring, appropriately constructed with a small passage surface, and must then move between the casing sleeve and the envelope in the circulation direction up to the opening of the outer sealing ring. This path is very long and the casting or foaming material has an adequate possibility of coming into contact with atmospheric oxygen so as to ensure curing or setting and thereby reliably preventing an escape of the casting or foaming material.

In a further preferred development the light emitting diode is inserted in a recess located in the contact display module. This can be particularly simply implemented by an axial blind hole formed in the contact display module.

Appropriately the light emitting diode is inserted only after the moulding of the cable and contact display module with the envelope.

It is also preferable in this connection if the contact pins and terminals of the light emitting diode in the preassembly state extend in the direction of the electronic casing. For the installation of the sensor module the inventive casing termination then only has to be mounted on the board. Then the contact pins and terminals of the light emitting diode can be connected with the corresponding terminals on the printed circuit board. In principle, this can be brought about by clamping contacting. However, a usable mechanical and electrical stability is only brought about if the contacts are in each case soldered.

Further advantages and characteristics of the present invention are explained in greater detail with respect to the attached diagrammatic drawings, wherein show.

Figure 1:
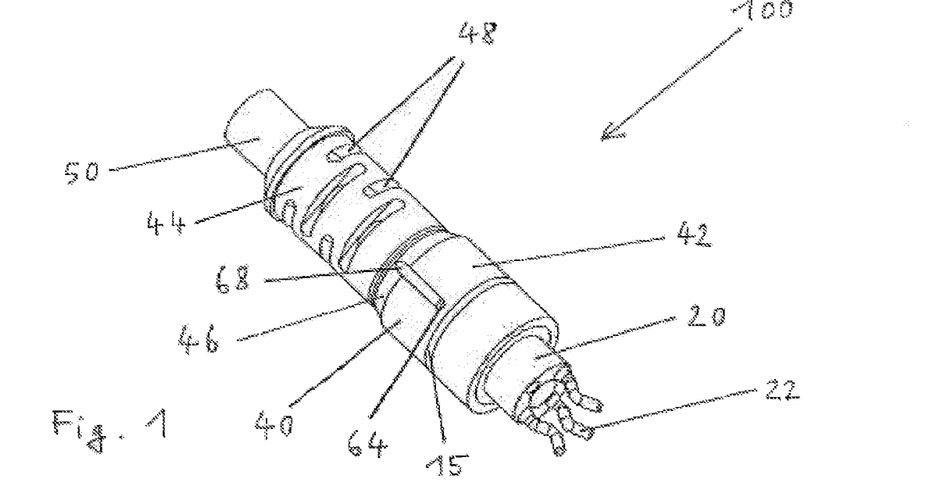
FIG. 1 A first embodiment of a casing termination according to the invention.
Figure 2:
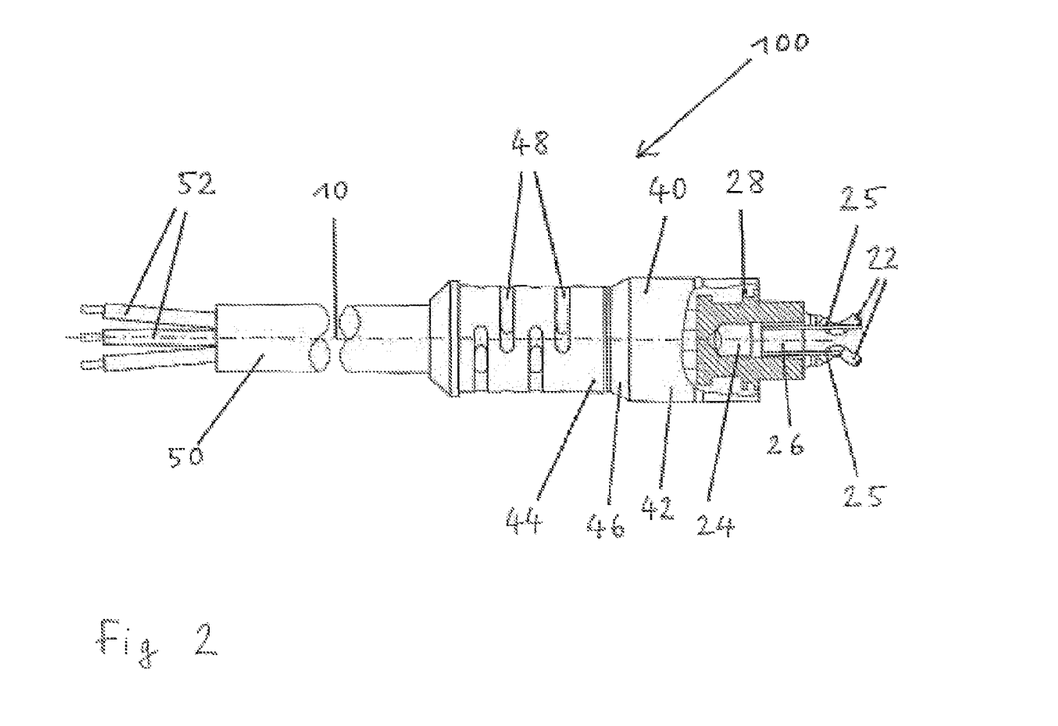
FIG. 2 A part sectional view of the embodiment of FIG. 1.
Figure 4:
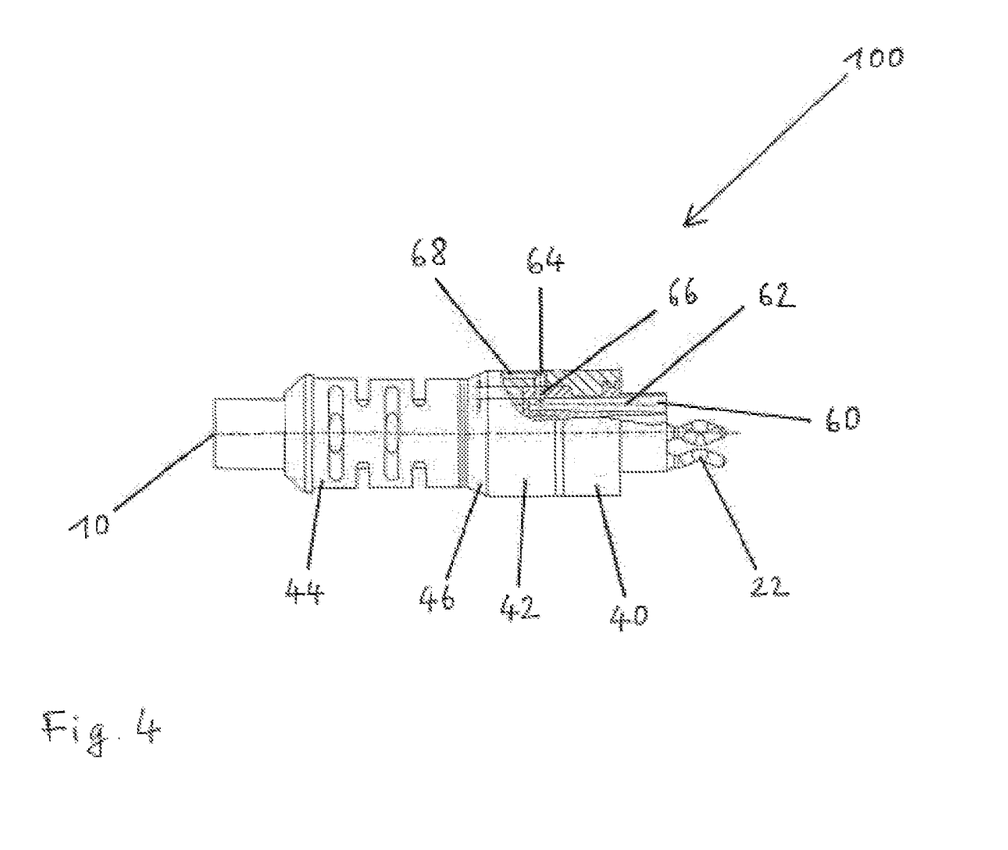
FIG. 4 A further, part sectional view of the embodiment of FIG. 1.

FIGS. 1, 2 and 4 diagrammatically show an embodiment of an inventive casing termination 100, where identical components are given the same reference numerals. The casing termination according to the invention has as essential components a contact display module 20, a connecting cable 50 connected thereto and an envelope 40, which inventively surrounds an end region 54 of cable 50 and at least partly the contact display module 20.

Figure 3:
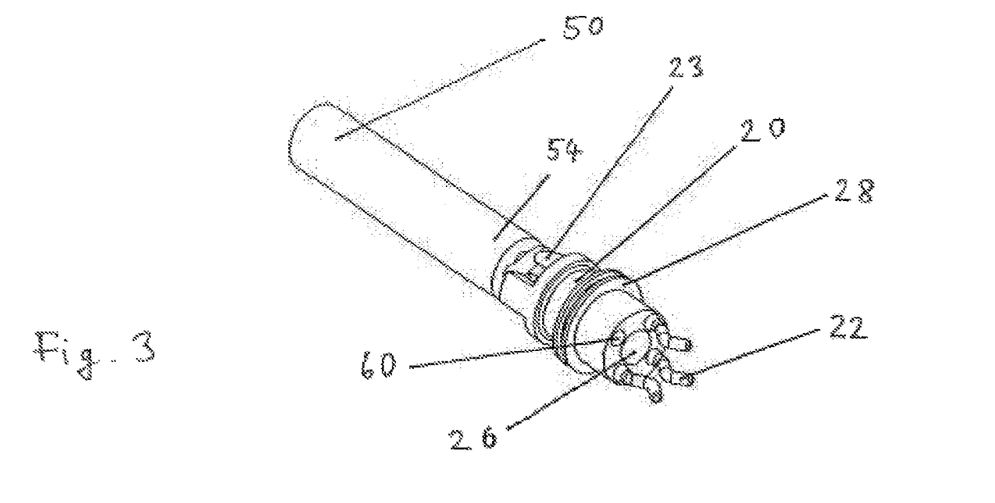
FIG. 3 A view of the contact display module of the embodiment of FIG. 1 with a connecting cable.

FIG. 3 shows the connecting cable 50 connected to contact display module 20 prior to the fitting of envelope 40. Contact display module 20 is essentially a plastic part moulded from transparent material and receiving contact elements 22. The latter are in the embodiment shown contact pins which for soldering to a printed circuit board are already appropriately bent. The contact display module 20 has a substantially cylindrical shape and for mechanical stabilization and providing a tension-proof connection a plurality of profilings 28 are provided on its circumference.

FIG. 2 shows how the envelope 40 embraces said profilings 28. FIGS. 2 and 3 show that a light emitting diode 24 as a lighting element is inserted in a recess 26 in contact display module 20. In the embodiment shown the recess 26 is an axial, central blind hole, in which is inserted the light emitting diode 24, preferably after fitting the envelope. FIG. 2 also shows the way in which the terminals 25 of light emitting diode 24 and the contact pins 22 extend in the axial direction 10 towards the casing.

The envelope 40, which is preferably fitted by moulding the end region of cable 50 and contact display module 20, in the embodiment shown comprises a larger diameter, casing-near connecting area 42 and a smaller diameter, casing-remote cable extension 44 and a here conically constructed transition area 46. For providing greater flexibility cable extension 44 is given a plurality of elongated holes 48 which extend circumferentially.

The conical transition area 46 is used, in the manner described in greater detail hereinafter, for supporting a flanged edge of a casing sleeve.

According to the invention the envelope 40 is also made from a transparent material, so that the light of light emitting diode 24 can be particularly satisfactorily observed by a user.

For sealing the inventive casing termination 100 relative to a casing sleeve to be engaged over the casing-near connecting area 42 during the assembly of an electronic casing, a circumferential sealing ring 15 is provided in the casing-near connecting area 42 of envelope 40.

Figure 7:
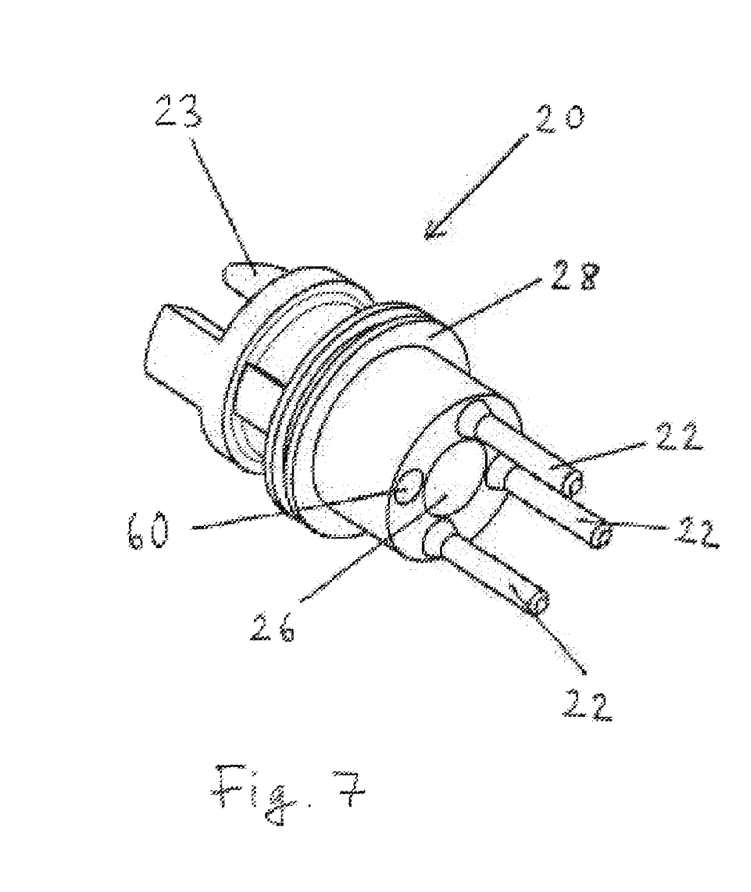
FIGS. 7 and 8 Perspective views of a contact display module before assembly.
Figure 8:
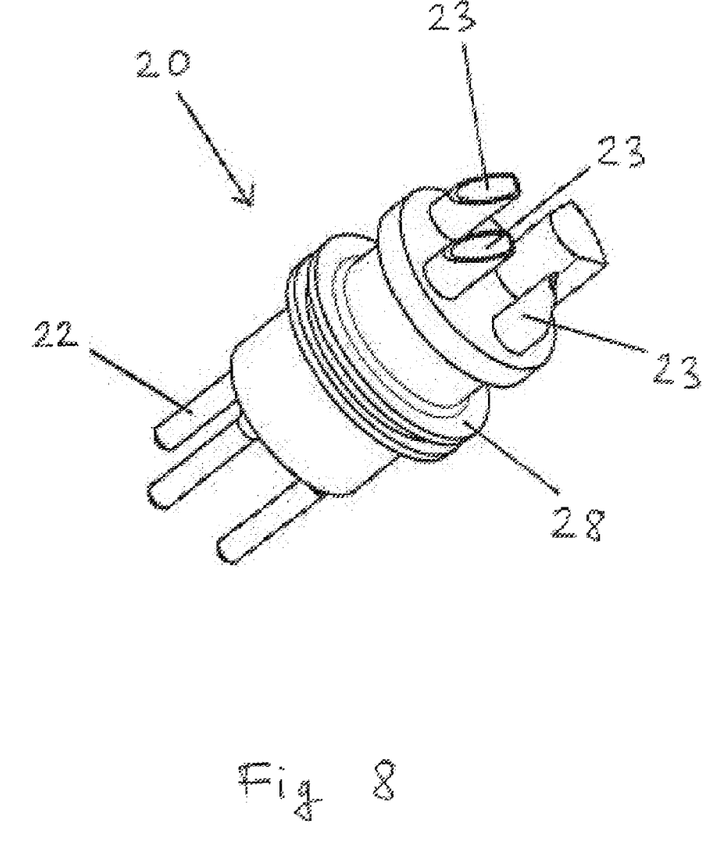

FIGS. 7 and 8 show the contact display module in separate perspective views. Here contact pins 22 are still in an unbent starting state. It is particularly easy to see in these views the recess 26 for receiving a light emitting diode, an air duct 60 and, on the back of the contact display module 20, a total of three soldering bushes 23 in the embodiment shown.

As shown in FIG. 3, the individual conductors 52 of cable 50 are connected with said soldering bushes 23, which on the side of the contact display module 20 facing the contact pins 22 project therefrom.

A further important technical feature of the contact display module 20 and surrounding envelope 40 is the air duct 60 shown in detail in a part sectional view in FIG. 4. This air duct 60 firstly comprises a blind hole formed in contact display module 20 and which for manufacturing reasons has a slightly conical shape. Subsequently the air duct 60 is formed from a lateral opening 66 in contact display module 20 and a connecting opening 64 aligned therewith in envelope 40. The connecting opening 64 in envelope 40 and the lateral opening 66 in contact display module 20 are produced by a borehole. The connecting opening 64 issues into an outer groove 68 extending in axial direction 10. FIG. 1 shows that this groove 68 terminates in the conical transition area 46 of envelope 40. A flanged over edge of a casing sleeve, which is supported on the conical area 46 of envelope 40, consequently closes groove 68.

The length of the casing sleeve is preferably such that even with the flanged edge the conical area 46 is not completely covered. Thus, the light emitting diode 24 can also be observed from the rear, i.e. from the direction of the outgoing cable in a large polar angle range over the entire azimuth angle. The good all-round visibility of the lighting element in the inventive casing termination is a further important advantage of the invention.

In addition, the cable disconnection forces and therefore overall stability are increased by the flanged edge of a casing sleeve.

In the air duct 62 of contact display module 20 can be inserted a felt element, which allows the air to escape, but limits the foaming of the foam resin filled into the casing. Thus, the felt brings about a foaming stop and there is consequently no need to clean excess resin residues of a sensor made in this way.

Figure 10:
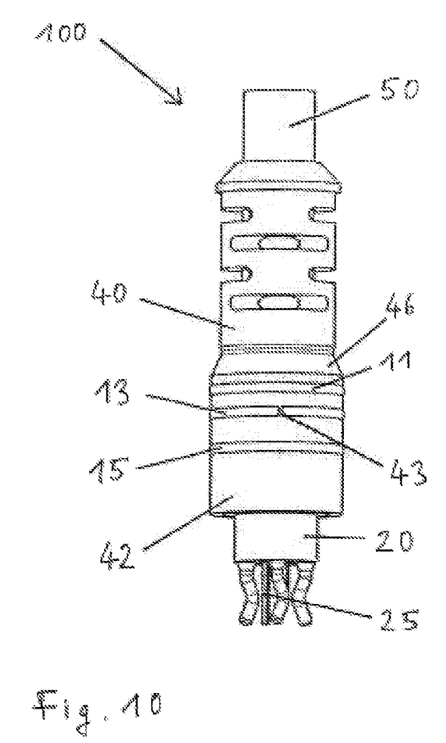
FIGS. 10 and 11 Further views of opposite sides of the casing termination of FIG. 9.
Figure 11:
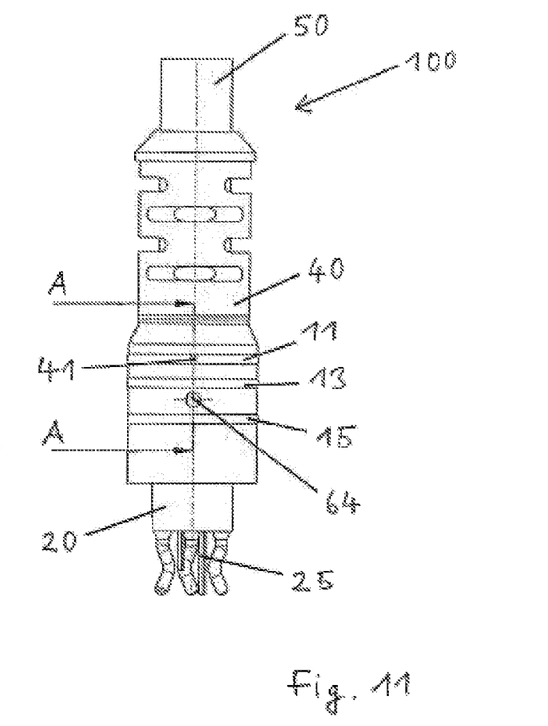

An alternative embodiment of an inventive casing termination 100 is described relative to FIGS. 9 to 12, where once again equivalent components are given the same reference numerals as in FIGS. 1 to 6. In the embodiment shown in FIGS. 9 to 12 an alternative, particularly elegant ventilation possibility is implemented. The essential difference compared with the embodiment shown in FIGS. 1 to 4 is that the envelope not only has a circumferential sealing ring 15, but also two further sealing rings 11, 13. These sealing rings 11, 13, which with respect to the circumferential sealing ring 15 are located on the outside, i.e. in the direction of connecting cable 50, are in each case provided with an axial opening 41, 43 respectively, which can be seen in FIGS. 9 to 11.

Figure 9:
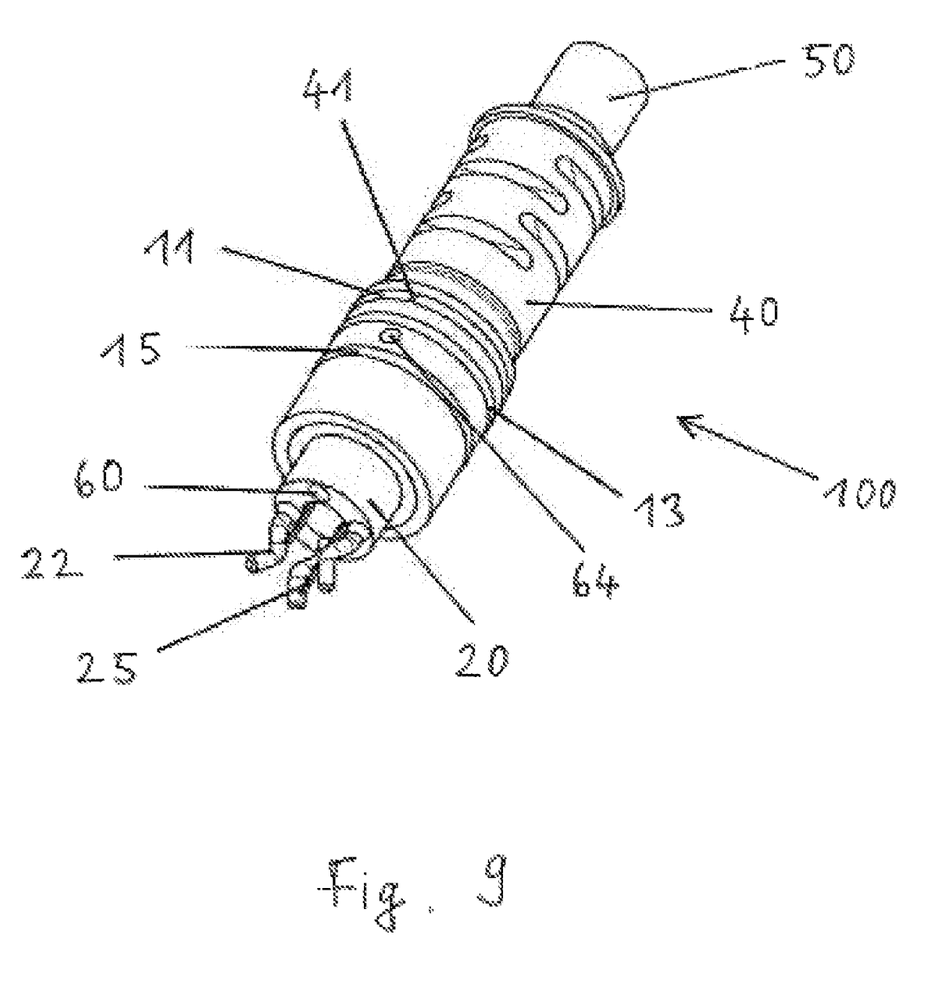
FIG. 9 A perspective view of an alternative embodiment of an inventive casing termination.

In the alternative ventilation principle the envelope 40 in the casing-near portion 42 in the area between the through opening, i.e. the connecting opening 64 to air duct 62 of contact display module 20 and the conical shoulder 46, has several sealing rings 11, 13, which are interrupted in alternatively facing manner. A further, inside sealing ring 15, as in the previously described embodiment, is present upstream of the through opening in the direction of the printed circuit board for sealing the sensor cavity to be filled. Any material passing out of the air duct 60 via through opening 64 must consequently be present between the circumferential sealing ring 15 and the first interrupted sealing ring 13 on the side opposite to the through opening 64, because the opening 43 of sealing ring 13 is located there. From there the escaping material, in order to be able to pass completely to the outside, must again move back between the first interrupted sealing ring 13 and the second interrupted sealing ring 11 on the side of the through opening 64, where the second sealing ring 11 is also provided with an opening 41. As a result of the path covered by the casting or foaming material this principle can also be referred to as meandering ventilation. The facing arrangement of openings 41, 43 of sealing rings 11, 13 can be gathered from FIGS. 10 and 11, which show facing sides of the casing termination.

Figure 12:
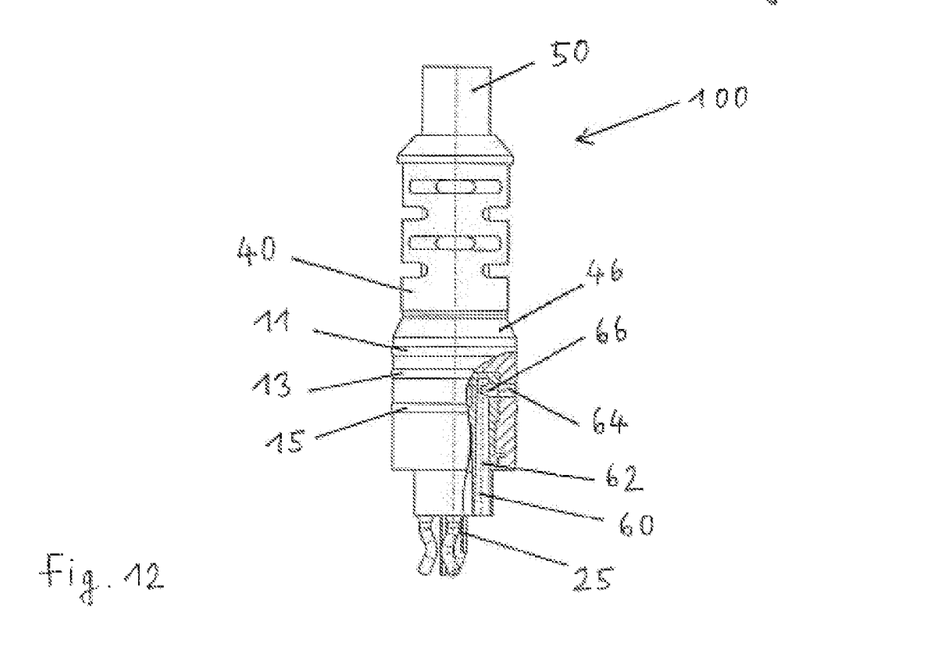
FIG. 12 A part sectional view along line A-A in FIG. 11 of the inventive casing termination of FIG. 9.

FIG. 12 shows how the connecting opening 64, which can also be called a through opening, is located between the circumferential sealing ring 15 and the first interrupted sealing ring 13. Moreover, in the embodiment shown in FIGS. 9 to 12, a light emitting diode is already inserted in contact display module 20, whose terminations 25 project outwardly towards the casing.

An axial groove is unnecessary in this variant. Another advantage of this embodiment is that there is no need to insert a felt or other textile material. Particularly from the method standpoint further simplifications and therefore cost advantages are obtained.

Figure 5:
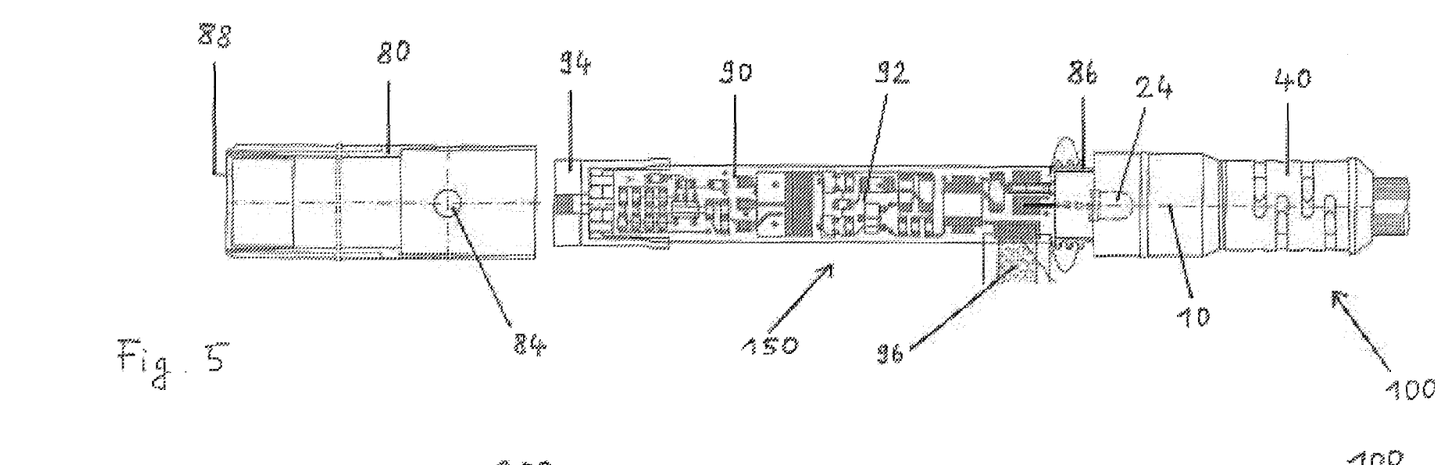
FIG. 5 Components of a sensor with an inventive casing termination prior to assembly.
Figure 6:
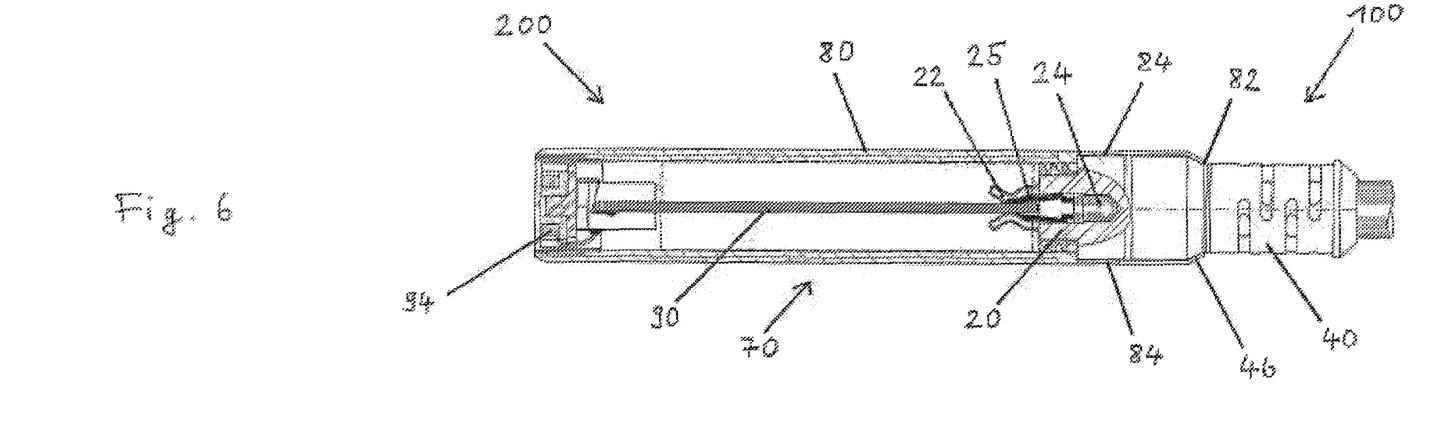
FIG. 6 An assembled sensor in a part sectional view with an inventive casing termination.

The assembly of a sensor with an inventive casing termination 100 is explained relative to FIGS. 5 and 6, working on the basis of a one-way assembly principle. This essentially only involves the insertion of a sensor module 150 into a cylindrical casing sleeve 80, which is terminated at one end by a cup 88, which can also be called a front cap. The sensor module 150 inserted in casing sleeve 80 is diagrammatically shown in FIG. 5. The essential component of this sensor module 150 is an inventive casing termination 100, which is placed on a first narrow side of an elongated printed circuit board 90. The contact pins 22 and terminals 25 of light emitting diode 24 are soldered to circuit board 90. On the side of circuit board 90 opposite to casing termination 100 is provided a sensor element 94 and in the embodiment shown it is in the form of a coil with a ferrite element. However, in principle it is possible to use any sensor element type. FIG. 5 also diagrammatically shows a shielding foil 96, which can be inserted in the casing sleeve 80 prior to final assembly, i.e. prior to the insertion of sensor module 150 and around it can be wound circuit 92. On inserting the sensor module 150 into the cylindrical casing sleeve 80 the foaming material can be simultaneously introduced. Alternatively the foaming material can be introduced into the cylindrical casing sleeve 80 prior to the insertion of sensor module 150. As explained hereinbefore, the air still present in the casing interior can escape through the air duct 60. For the manufacture of the sensor 200 an edge 82 of casing sleeve 80 is flanged, so that it is supported on the conical transition area 46 of cylindrical envelope 40 and in this way closes groove 68. This is illustrated in FIG. 6 in a sectional cross-sectional view.

In casing sleeve 80 are provided numerous lateral openings 84 through which the light of light emitting diode 24 can also be laterally observed. As explained hereinbefore, the light of light emitting diode 24 can also be observed from the outgoing cable direction in a large polar angle and over the entire azimuth angle.

Between casing termination 100 and casing sleeve 80 is provided a sealing element 86, which can e.g. be made from a flexible plastics material.

Thus, on assembly, the inventive casing termination 100 together with cable 50 and LED 24 can be mounted and soldered on a printed circuit board 90 on which is already fitted a sensor coil. The thus formed sensor module 150 is then inserted in the casing 70 to be filled or already filled with an appropriate foam resin quantity. Ventilation by means of air duct 60 ensures during the last part of insertion and also during the gradual foaming of the resin that the necessary volume compensation takes place.

The present invention provides a subassembly for a modular assembly procedure, namely a casing termination for an electronic casing, which is already largely prepared for the final assembly of a sensor. The inventive casing termination incorporates an electroluminescent display and a cable bushing and in preferred variants more particularly allows a clearly defined ventilation of the sensor casing during foaming and following final assembly. To bring about high cable disconnection forces a rear edge of a casing sleeve can be flanged and supported on a diameter transition area of the envelope.

Thus, the casing termination according to the invention provides a unit constituted by the outgoing cable, electroluminescent display and mechanical casing closure.

The components of the casing termination according to the invention can in each case be made particularly simply, e.g. by injection moulding. Through the moulding of the contact display module and end region of the cable it is also possible to bring about a high sealing of the overall arrangement and therefore a good electrical and mechanical stability. A vital advantage of the inventive casing termination is in particular the high cable disconnection forces achieved with simple means. Excess air can escape through the air duct on foaming following final assembly. An independent foaming stop on reaching the air duct can be brought about by an optionally inserted felt element. In an alternative variant there is no need for such textile pieces and a plurality of interrupted sealing rings is then provided on opposite sides. Any casting or foaming material which escapes then hardens before it can actually pass to the outside. The LED status display can be observed both laterally and from the rear in a highly advantageous manner by the user.

As a result of the inventive casing termination there is a considerable improvement with respect to modular assembly procedures, because only a small number of method steps is needed, which leads to significant cost savings.

The invention claimed is:

1. Casing termination for an electronic casing, with several contact elements for contacting an electronic circuit received in the electronic casing, with a connecting cable having several conductors in each case connected to the contact elements and with an at least one lighting element for providing an optical display for a user, wherein
the contact elements and the at least one lighting element are housed in an at least partly transparent contact display module and
the at least partly transparent contact display module together with an end region of the connecting cable are at least partly surrounded by an at least partly transparent, integrally manufactured envelope for mechanical stabilization and electrical insulation purposes, so that the connecting cable is connected in tension-proof manner to the at least partly transparent contact display module.

2. Casing termination according to claim 1, wherein the envelope has a connecting area with a larger diameter, which is arranged near the casing and a cable extension with a smaller diameter, which is arranged remote from the casing, a transition between the connecting area and the cable extension being constructed for a tension-proof back-engagement with a casing sleeve.

3. Casing termination according to claim 1, wherein the contact elements are contact pins and wherein the contact pins and terminals of the at least one lighting element extend in a preassembly state in the direction of the electronic casing.

4. Casing termination according to claim 1, wherein the envelope is manufactured by moulding the at least partly transparent contact display module and the end region of the connecting cable.

5. Casing termination according to claim 1, wherein for providing a tension-proof connection to the envelope, the at least partly transparent contact display module has at least one profiling.

6. Casing termination according to claim 1, wherein the at least one lighting element is inserted in a recess provided in the at least partly transparent contact display module.

7. Casing termination according to claim 6, wherein the recess for the at least one lighting element is an axial blind hole in the at least partly transparent contact display module.

8. Casing termination according to claim 1, wherein an air duct is formed in at least one of the at least partly transparent contact display module or the envelope.

9. Casing termination according to claim 8, wherein a semipermeable element is placed in the air duct and which is permeable to air and impermeable to a foaming or casting material to be introduced.

10. Casing termination according to claim 8, wherein as part of the air duct the at least partly transparent contact display module has a blind hole extending in an axial direction with a lateral opening at right angles to the axial direction.

11. Casing termination according to claim 8, wherein, as part of the air duct, the envelope has an outer groove running in an axial direction with a connecting opening at right angles to the axial direction and which is aligned with the lateral opening of the at least partly transparent contact display module.

12. Casing termination according to claim 1, wherein the envelope has a plurality of sealing rings for sealing with respect to a casing sleeve to be engaged over a partial area of the envelope and wherein for providing an air duct at least one of the sealing rings is provided with at least one axial opening.

13. Casing termination according to claim 12, wherein at least two sealing rings have an axial opening, the axial openings of the at least two sealing rings being mutually offset in the circumferential direction and in particular on opposite sides to one another.

14. Sensor module having a casing termination according to claim 1, with the electronic circuit placed on a printed circuit board, the contact pins and terminals of the at least one lighting element of the casing termination being connected to the printed circuit board and with a sensor element, facing the casing termination on the printed circuit board.

15. Sensor with a sensor module according to claim 14, which is inserted in a casing sleeve, the latter being closed by a front cap on the opposite side to the casing termination.

16. Sensor according to claim 15, wherein the casing sleeve is connected in tension-proof manner to the casing termination by a flanged edge of the casing sleeve.

17. Method for the manufacture of a casing termination for an electronic casing according to one of the claims 1 to 13, in which the conductors of a connecting cable are connected to the contact elements, which are received in the at least partly transparent contact display module, in which the at least one lighting element, is inserted in a recess provided for this purpose in the at least partly transparent contact display module and in which the at least partly transparent, integral envelope is fitted round the at least partly transparent contact display module and the end region of the connecting cable for electrical insulation and mechanical stabilization purposes.

18. Method according to claim 17, wherein the envelope is fitted by moulding the contact display module and the end region of the connecting cable.

19. Method according to claim 17, wherein an air duct is formed in at least one of the envelope or the at least partly transparent contact display module.

* * * * *